(12) United States Patent
McGinnis et al.

(10) Patent No.: US 9,785,921 B2
(45) Date of Patent: Oct. 10, 2017

(54) SYSTEMS AND METHODS FOR PROCESSING DECOUPLED DEBIT TRANSACTIONS

(71) Applicant: FIRST DATA CORPORATION, Greenwood Village, CO (US)

(72) Inventors: Charles McGinnis, Houston, TX (US); Christopher J. Baehr, Houston, TX (US); Charles R. Williams, Houston, TX (US)

(73) Assignee: First Data Corporation, Greenwood Village, CO (US)

(*) Notice: Subject to any disclaimer, the term of this patent is extended or adjusted under 35 U.S.C. 154(b) by 0 days.

(21) Appl. No.: 15/174,672

(22) Filed: Jun. 6, 2016

(65) Prior Publication Data

US 2016/0358131 A1    Dec. 8, 2016

Related U.S. Application Data

(60) Provisional application No. 62/171,761, filed on Jun. 5, 2015.

(51) Int. Cl.
| | | |
|---|---|---|
| *G06K 5/00* | (2006.01) | |
| *G06Q 20/04* | (2012.01) | |
| *H04N 5/225* | (2006.01) | |
| *G06F 3/0484* | (2013.01) | |
| *G06K 7/14* | (2006.01) | |

(Continued)

(52) U.S. Cl.
CPC ....... *G06Q 20/042* (2013.01); *G06F 3/04842* (2013.01); *G06K 7/10722* (2013.01); *G06K 7/1413* (2013.01); *G06K 7/1417* (2013.01); *G06Q 20/20* (2013.01); *G06Q 20/322* (2013.01);

(Continued)

(58) Field of Classification Search
CPC .............. G06K 5/00; G06K 7/10; G06K 9/22; G06K 19/00; G06Q 40/00; G07D 11/00; G07F 19/00; G06F 17/00
USPC ..... 235/380, 379, 375, 462.45, 472.01, 487; 705/16, 42, 44
See application file for complete search history.

(56) References Cited

U.S. PATENT DOCUMENTS

| | | | |
|---|---|---|---|
| 2005/0108168 A1* | 5/2005 | Halpin ................. | G06Q 20/042 705/45 |
| 2010/0274678 A1* | 10/2010 | Rolf ...................... | G06Q 20/04 705/17 |

(Continued)

*Primary Examiner* — Edwyn Labaze
(74) *Attorney, Agent, or Firm* — Eversheds Sutherland (US) LLP (57) ABSTRACT

The disclosure relates to systems and methods for processing decoupled debit transactions. In one embodiment, a system is provided. The system can include a device with a camera and a graphical user interface, and the system can further include a server. The device can identify received user information for a first transaction provided by a user to the graphical user interface of the device. The camera can capture an image of a check for the first transaction. The device can generate a first transaction message comprising the user information and the image of the check. The device can send the first transaction message to the server. The device can identify an indication received from the server that the user is approved for enrollment in a decoupled debit program, and the device further identifies an identifier received from the server for a decoupled debit program account. The graphical user display can display the indication to the user.

20 Claims, 5 Drawing Sheets

(51) Int. Cl.
*G06K 7/10* (2006.01)
*G06Q 20/32* (2012.01)
*G06Q 20/20* (2012.01)

(52) U.S. Cl.
CPC ......... *G06Q 20/3276* (2013.01); *H04N 5/225* (2013.01)

(56) References Cited

U.S. PATENT DOCUMENTS

| | | | | |
|---|---|---|---|---|
| 2011/0000961 A1* | 1/2011 | McNeal | ............... | G06Q 20/042 235/382 |
| 2011/0320316 A1* | 12/2011 | Randazza | ............... | G06Q 20/02 705/26.43 |
| 2013/0238455 A1* | 9/2013 | Laracey | ............... | G06Q 20/108 705/21 |
| 2014/0236820 A1* | 8/2014 | Carlton | ............... | G06Q 20/108 705/42 |

* cited by examiner

SYSTEMS AND METHODS FOR PROCESSING DECOUPLED DEBIT TRANSACTIONS

CROSS-REFERENCE TO RELATED APPLICATION

This application claims the benefit of U.S. Provisional Application No. 62/271,761, filed Jun. 5, 2015, which is hereby incorporated by reference.

TECHNICAL FIELD

The disclosure relates to transaction processing, and, more particularly to, systems and methods for processing decoupled debit transactions.

BACKGROUND

In many retail businesses, the use of credit or debit cards can be a relatively quick and efficient way to complete a financial transaction. However, some customers may still desire to utilize a different mechanism for payment, such as writing a check. Writing a check may be cumbersome as it takes time to fill out the required information and for the merchant to verify the information. Such transactions may require additional time to complete, which may cause delays for other customers waiting in line. In some instances, the use of a credit or debit card may not be an option and the customer may need to use the check, which may cause delays. Additionally, some merchants may store information obtained from checks, which may pose potential security risks.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

This disclosure relates to, among other things, systems, methods, computer-readable media, techniques and methodologies for processing decoupled debit transactions. In some embodiments, users may wish to use their checking or savings accounts without the hassle of writing checks. In some embodiments, a point of sale (POS) device may be used to enter user information as well as capture an image of a check. The POS device may then transmit the user information and the image of the check to a decoupled debit server. The decoupled debit server may use the information received from the POS device to determine whether the user is approved to be enrolled in a decoupled debit program. The decoupled debit server may obtain financial information (e.g., routing and account information) from the check by using optical character recognition (OCR). The decoupled debit server may use the user information and financial information to obtain additional information (e.g., credit history, transaction history, spending history from the bank of the checking or savings account associated with the check, etc.). The decoupled debit server may then determine whether to enroll the user in the decoupled debit program based on such information. If the user is enrolled, an identifier may be associated with the financial information. The identifier may be a new identifier or may be an existing identifier, such as a loyalty account identifier. The decoupled debit server may transmit the identifier to the POS device for presentation to the user.

The user may use the identifier in lieu of writing a check for future transactions. For example, the next time the user purchases an item from the merchant, the user may present the identifier (e.g., a quick response (QR) code on their mobile device, a physical card with the identifier in a magnetic stripe, and/or a wallet application that can transmit the identifier using Bluetooth, NFC, etc.) to the merchant to complete the transaction, thus eliminating the need to write a check. The financial information from the check is identified by the decoupled debit server, which may use the information to complete the transaction. As the financial information (e.g., routing and account information) is stored and utilized by the decoupled debit server, the merchant does not have access to the data, thus reducing potential security risks associated with privacy breaches of the merchant POS devices.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Figure 1:
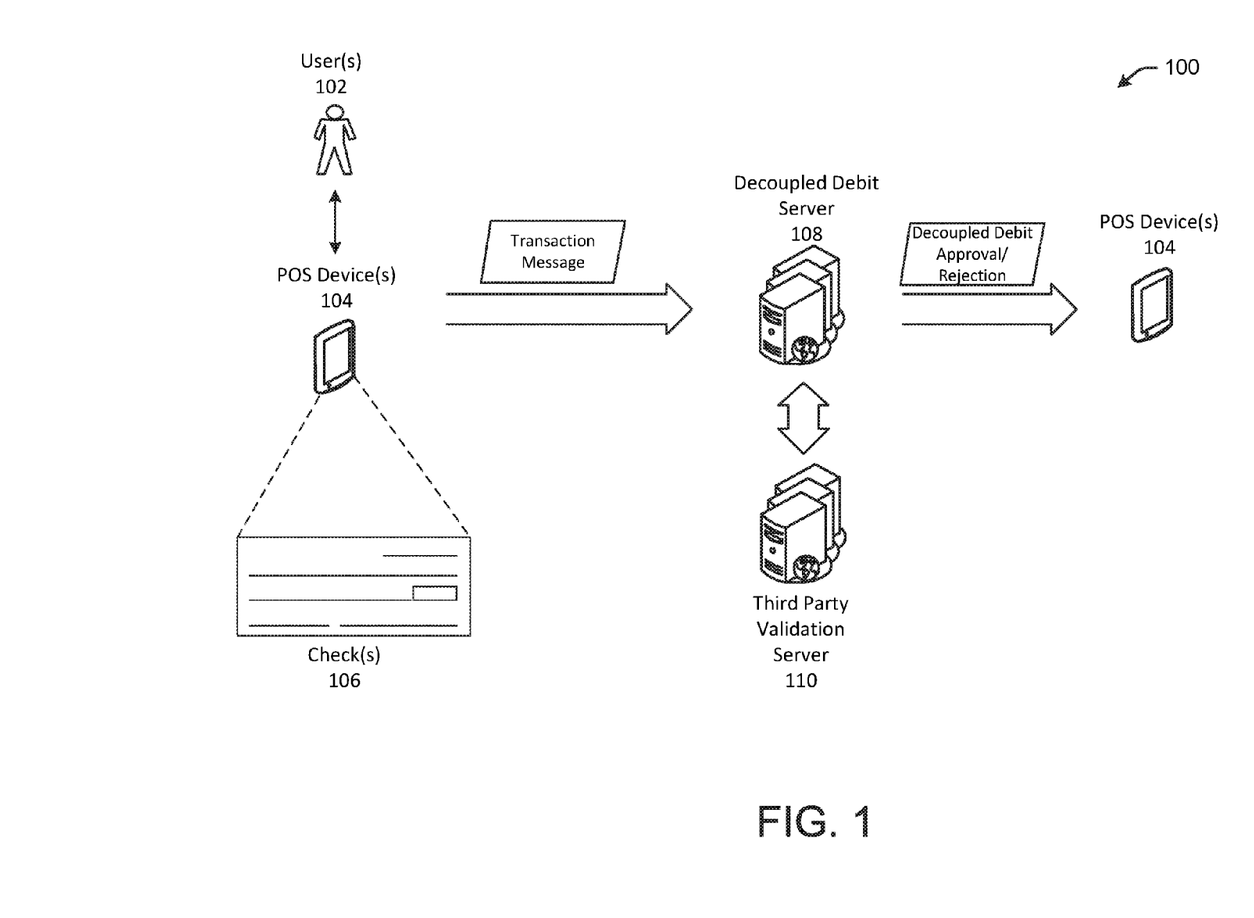
FIG. 1 depicts an illustrative data flow between various components of an illustrative system architecture for decoupled debit transactions in accordance with one or more embodiments of the disclosure.

FIG. 1 depicts an illustrative data flow between various components of an illustrative system architecture for decoupled debit transactions in accordance with one or more embodiments of the disclosure. For illustrative purposes, this disclosure generally describes the methods and systems in the context of merchandise, such as consumer goods (e.g., electronic books, movies, music, physical products, etc.). However, the product as described herein may be generally applicable to physical goods and/or services.

One or more illustrative POS devices 104 operable by one or more users 102 are illustratively depicted in FIG. 1. The POS device(s) 104 may include any suitable device capable of facilitating transactions, communicating with other devices over a network, and obtaining information (e.g., graphical user interface and/or sensors associated with the POS device 104). The POS device(s) 104 may include any suitable processor-driven computing device including, but not limited to, a smartphone or other cellular device, a tablet device, an electronic reader device, a laptop computing device, a gaming console, a multimedia content streaming device, a set-top box, wearable computing devices, and so forth. For ease of explanation, the POS device(s) 104 and the user(s) 102 may be described herein in the singular; however, it should be appreciated that multiple POS devices 104 operable by multiple users 102 may be provided.

In various example embodiments, a user 102 may interact with a POS device 104 to provide user information via a graphical user interface. For example, in conjunction with a purchase transaction initiated on the POS device 104, a user may provide their name, address, phone number, email address, and the like using a touch display or other input/output mechanism, such as a keyboard and mouse. The POS device 104 may obtain an image of a check 106 using one or more sensor devices, such as a camera. The POS device 104 may generate and transmit a message that includes transactional information (e.g., total amount owed by the user 102 for the purchase transaction, check image, and user information) to a decoupled debit server 108.

In some embodiment, the decoupled debit server 108 may receive the transaction message. The decoupled debit server may use the information in the message to determine whether the user 102 is approved or rejected from enrollment in a decoupled debit program. In some embodiments, the decouple debit server may facilitate obtaining financial information from the image of the check 106 using optical character recognition. The financial information may include routing and account information for a savings or checking account associated with the check. The decoupled debit server may use the user information, financial information, and transaction information to determine whether to reject or approve the user for the decoupled debit program. In some embodiments, the decoupled debit server 108 may transmit user information, financial information, and/or additional information to a third party validation server 110 for validation. If the user is approved, an identifier may be generated and associated with the financial information. A message may be generated and transmitted to the POS device 104. The message may either indicate that the user 102 was rejected from enrollment in the decoupled debit program or that the user 102 was approved and the message may include the identifier.

The identifier may be used by the user 102 in future purchase transactions with the merchant. The identifier may be used in lieu of another check as the information from the check is stored in association with the identifiers by the decoupled debit server. The user 102 may present the identifier (e.g., physical card, wallet application, receipt with QR code of the identifier, or the like) to the merchant and then the merchant may transmit a transaction message to the decoupled debit server with the identifier. The decoupled debit server may retrieve financial information based on the identifier and may use the financial information to complete the purchase transaction initiated by the merchant via the POS device 104.

Figure 2:
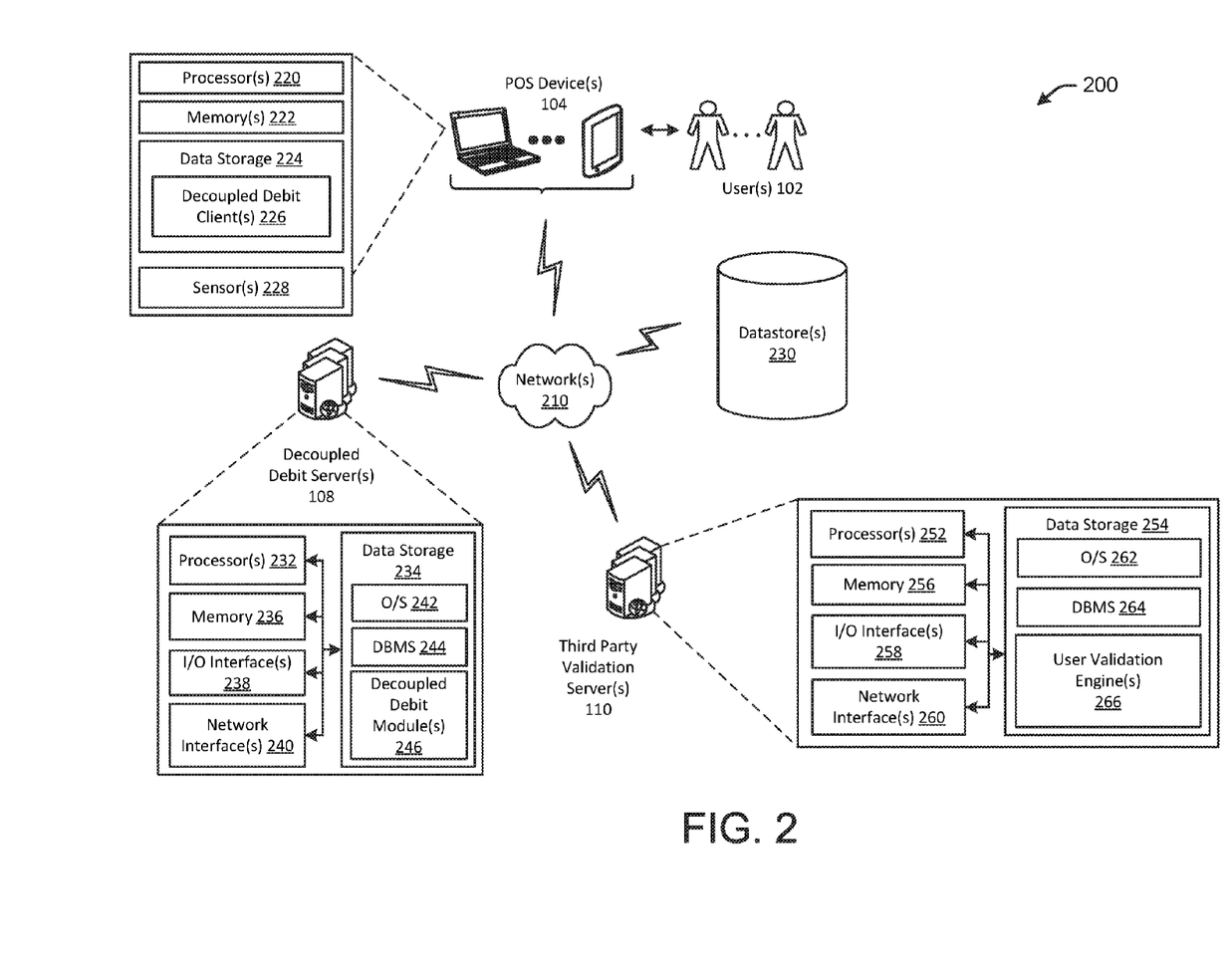
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative architecture 200 may include one or more POS devices 104 operable by one or more users 102, one or more decoupled debit server(s) 108, one or more third party validation server(s) 110, and/or one or more datastore(s) 230. The POS device(s) 104 may include any of the types of devices described through reference to FIG. 1.

Any of the POS device(s) 104, one or more decoupled debit server(s) 108, one or more third party validation server(s) 110, and/or one or more datastore(s) 230 may be configured to communicate with each other and any other component of the architecture 200 via one or more network(s) 210. The network(s) 210 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 210 may have any suitable communication range associated therewith and may include, for example, global networks (e.g., the Internet), metropolitan area networks (MANs), wide area networks (WANs), local area networks (LANs), or personal area networks (PANs). In addition, the network(s) 210 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The POS devices 104 may include one or more processor(s) 220 that may include any suitable processing unit capable of accepting digital data as input, processing the input data based on stored computer-executable instructions, and generating output data. The computer-executable instructions may be stored, for example, in the data storage 224 and may include, among other things, operating system software and application software. The computer-executable instructions may be retrieved from the data storage 224 and loaded into the memory 222 as needed for execution. The processor(s) 220 may be configured to execute the computer-executable instructions to cause various operations to be performed. The processor(s) 220 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 224 may store program instructions that are loadable and executable by the processor(s) 220, as well as data manipulated and generated by the processor(s) 220 during execution of the program instructions. The program instructions may be loaded into the memory 222 as needed for execution. Depending on the configuration and implementation of the POS device(s) 104, the memory 222 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 222 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

Various program modules, applications, or the like may be stored in data storage 224 that may comprise computer-executable instructions that when executed by the processor(s) 220 cause various operations to be performed. The memory 222 may have loaded from the data storage 224 one or more operating systems (O/S) that may provide an interface between other application software (e.g., dedicated applications, a browser application, a web-based application, a distributed client-server application, etc.) executing on the POS device(s) 104 and the hardware resources of the POS device(s) 104. More specifically, the O/S may include a set of computer-executable instructions for managing the hardware resources of the POS device(s) 104 and for providing common services to other application programs (e.g., managing memory allocation among various application programs). The O/S may include any operating system now known or which may be developed in the future including, but not limited to, any mobile operating system, desktop or laptop operating system, mainframe operating system, or any other proprietary or open-source operating system.

The data storage 224 may additionally include various other program modules that may include computer-executable instructions for supporting a variety of associated functionality. For example, the data storage 224 may include one or more decoupled debit client(s) 226. The decoupled debit client(s) 226 may include computer-executable instructions that in response to execution by the processor(s) 220 cause operations to be performed including receiving data from a user 102 via a graphical user interface, facilitating capturing an image of a check 106 utilizing one or more sensor device(s) 228, generating and transmitting messages to transmit to a decoupled debit server 108, receiving messages from the decoupled debit server 108, and displaying the message to the user 102.

The POS device(s) 104 may include one or more sensor device(s) 228, such as image sensors and/or collection devices (e.g., a microphone, cameras, video cameras, near field communication (NFC) scanners, RF scanners, infrared scanners, quick response (QR) code scanners, etc.) to capture one or more universal resource identifier(s) (URIs).

The decoupled debit server(s) 108 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the decoupled debit server(s) 108, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The decoupled debit server(s) 108 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The decoupled debit server(s) 108 may further include network interface(s) 240 that facilitate communication between the decoupled debit server(s) 108 and other devices of the illustrative system architecture 200 (e.g., POS device(s) 104, third party validation server(s) 110, etc.) or application software via the network(s) 210. The decoupled debit server(s) 108 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a gesture detection and/or capture device, a touch input device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the decoupled debit server(s) 108 and the hardware resources of the decoupled debit server(s) 108. More specifically, the O/S 242 may include a set of computer-executable instructions for managing the hardware resources of the decoupled debit server(s) 108 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores. The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more decoupled debit module(s) 246. The decoupled debit module(s) 246 may include computer-executable instructions that in response to execution by the processor(s) 232 cause operations to be performed including receiving data from and transmitting messages to POS device(s) 104 and/or third party validation server(s) 110, determining whether a user 102 should be enrolled in a decoupled debit program based on information obtained and analyzed, generating and storing identifiers and associations of the identifiers with checking or savings accounts, and facilitating completion of transactions using the identifiers to identify appropriate financial information associated with the user 102.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The third party validation server(s) 110 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the third party validation server(s) 110, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The third party validation server(s) 110 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The third party validation server(s) 110 may further include network interface(s) 260 that facilitate communication between the third party validation server(s) 110 and other devices of the illustrative system architecture 200 (e.g., POS device(s) 104, decoupled debit server(s) 108, etc.) or application software via the network(s) 210. The third party validation server(s) 110 may additionally include one or more input/output (I/O) interfaces 258 (and optionally associated software components such as device drivers) that may support interaction between a user and a variety of I/O devices, such as a keyboard, a mouse, a pen, a pointing device, a voice input device, a gesture detection and/or capture device, a touch input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the third party validation server(s) 110 and the hardware resources of the third party validation server(s) 110. More specifically, the O/S 262 may include a set of computer-executable instructions for managing the hardware resources of the third party validation server(s) 110 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores. The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more user validation engine(s) 266.

The user validation engine(s) 266 may include computer-executable instructions that in response to execution by the processor(s) 252 cause operations to be performed including obtaining additional information using user information and/or financial information, where the additional information may include a credit history, transactional history from other merchants, transactional history from the bank of the savings or checking account of the user, or other types of information. Based on the additional information, the user validation engine 266 may provide validation of a determination made by the decoupled debit module 246 associated with the approval or rejection of a user 102 for enrollment in a decoupled debit program.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Processes

Figure 3:
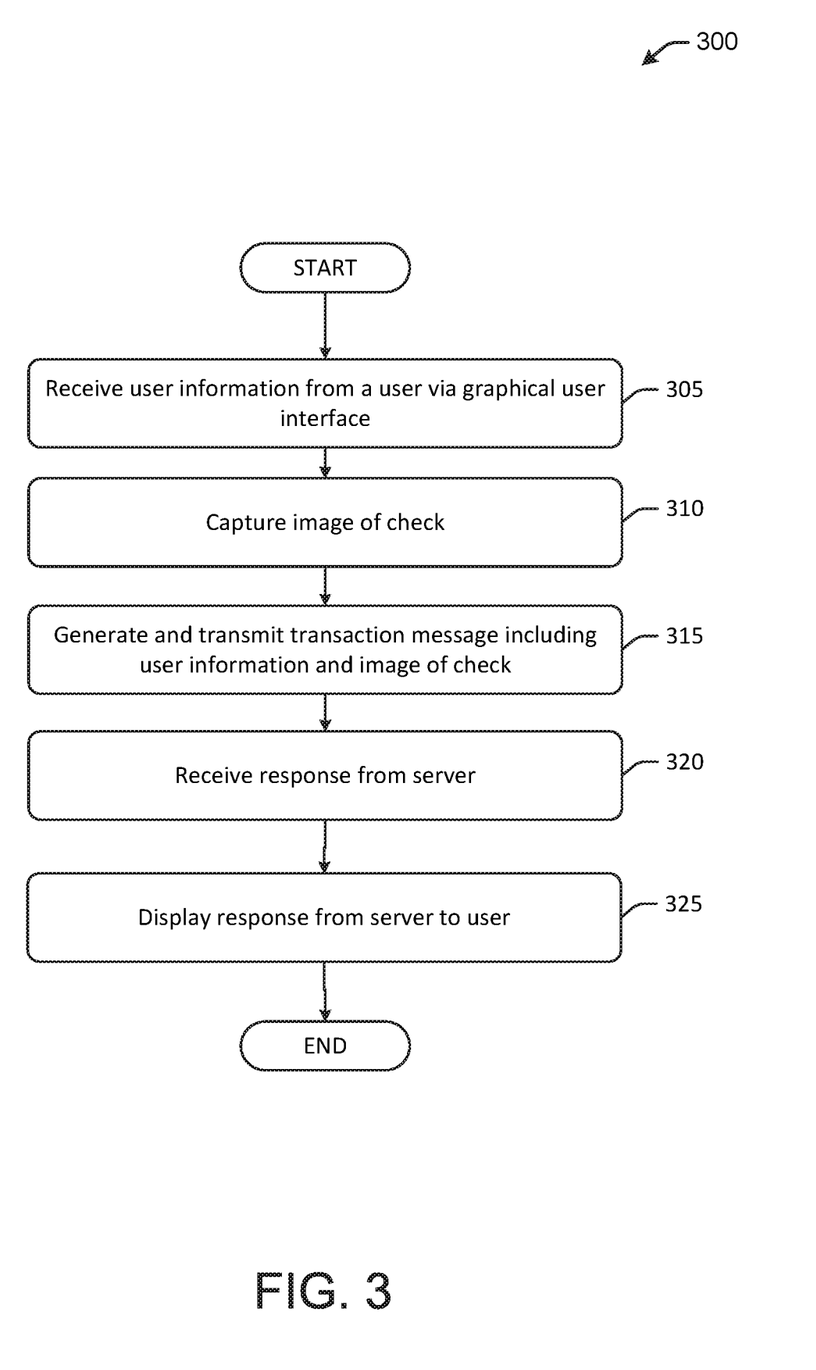
FIG. 3 is a process flow diagram of an illustrative method for enrolling in decoupled debit transactions in accordance with one or more embodiments of the disclosure.

FIG. 3 is a process flow diagram of an illustrative method 300 for enrolling in decoupled debit transactions in accordance with one or more embodiments of the disclosure. At block 305, the decoupled debit client 226 of the POS device 104 may receive user information from a user via a graphical user interface.

At block 310, an image of a check 106 for a checking or savings account may be captured using one or more sensors 228 of the POS device 104, such as a camera.

At block 315, the decoupled debit client 226 of the POS device 104 may generate a transaction message including the user information, information associated with a transaction (e.g., sales transaction), and the image of the check 106. The transaction message may be transmitted to the decoupled debit server 108 for processing.

At block 320, the decoupled debit client 226 of the POS device 104 may receive a response from the decoupled debit server 108. In some embodiments, the response may indicate that the user 102 is enrolled in the decoupled debit program and may display a message including the identifier associated with the checking or savings account from the check 106. The identifier may be a newly generated identifier, a previously existing loyalty identifier, or the like. In some embodiments, the response may indicate that the user 102 is not eligible to be enrolled in the decoupled debit program.

At block 325, the decoupled debit client 226 of the POS device 104 may display the response from the server to the user 102. The message may be printed on a receipt, emailed to an email address specified by the user 102, texted to a number specified by the user, displayed on the POS device 104, or the like. In some embodiments, the identifier may be obscured and transmitted to the user 102 in a separate communication from the decoupled debit server 108. In some embodiments, the identifier may be in the form of a code, such as a QR code or a barcode that may be texted, emailed, or printed and provided to the user 102. In some embodiments, the user 102 may scan a QR code or otherwise may enter the identifier on their user device which may then store the identifier in a wallet application. The wallet application may provide the identifier to a POS device 104 for future transactions.

Figure 4:
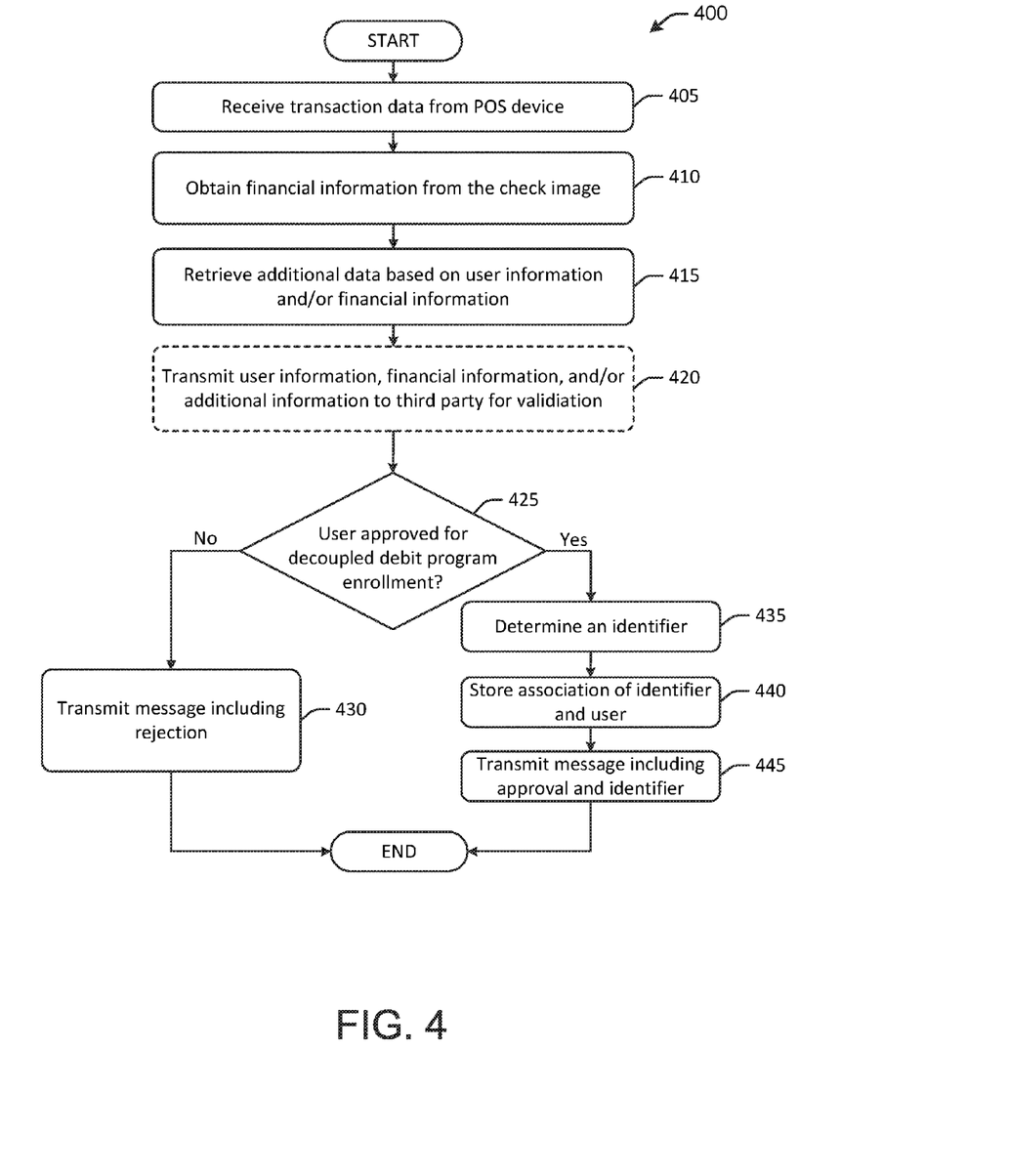
FIG. 4 is a process flow diagram of an illustrative method for processing an enrollment request for decoupled debit transactions in accordance with one or more embodiments of the disclosure.

FIG. 4 is a process flow diagram of an illustrative method 400 for processing an enrollment request for decoupled debit transactions in accordance with one or more embodiments of the disclosure. At block 405, the decoupled debit module 246 of the decoupled debit server 108 may receive a transaction message from a POS device 104. In some embodiments, the transaction message may be received over an encrypted network connection. In some embodiments, the transaction message may be received in a plurality of segments.

At block 410, the decoupled debit module 246 of the decoupled debit server 108 may facilitate obtaining financial information from the image of the check 106. In some embodiments, the decoupled debit server 108 may identify financial information from the image of the check 106 using optical character recognition (OCR). In some embodiments, the decoupled debit module 246 of the decoupled debit server 108 may transmit the image of the check 106 to a third party server to identify the financial information using OCR. The third party server may then transmit the financial information back to the decoupled debit module 246.

In some embodiments, financial information may be received from a POS device 104. In some embodiments, the POS device 104 may obtain the information from a mobile device in communication with the POS device 104. For example, a user device operated by a user 102 may be in communication with the POS device 104. Examples of a user device may include, but are not limited to, a smartphone, tablet, laptop, smart watch, wearable technology, or the like. The user device may be in communication with the POS device 104 using Bluetooth, RF, Wi-Fi, or other type of communicative link. In some embodiments, an application executing on the user device may communicate financial information associated with the user to the POS device. In some embodiments, the financial information may be transmitted from the user device to the POS device 104 in an encrypted message. In some embodiments, the application may be a digital wallet, merchant application, banking application, or the like. The user 102 may provide the financial information to the application (e.g., typing the information into the application) or the financial information may be transmitted from the application upon the user 102 signing into the application and initiating a transfer of the financial information to the POS device 104. In some embodiments, obtaining the information from the application of the user device may be in lieu of obtaining financial information from an image of a check. In some embodiments, a user 102 may log into their financial account (e.g., banking account, credit card account, etc.) from the POS device 104, which may then obtain the financial information from the account after the user 102 provides log in credentials to the POS device 104.

At block 415, the decoupled debit module 246 of the decoupled debit server 108 may retrieve additional data based on the user information and/or financial information. For example, the decoupled debit module 246 may retrieve a transaction history associated with the user 102. The transaction history may include transactions initiated by the user 102 with the merchant. The decoupled debit module 246 may analyze the transaction history to identify whether the user has negative transactions (e.g., returned checks for insufficient funds, etc.), whether the user 102 is in good standing with the merchant, and/or other factors.

At optional block 420, the decoupled debit module 246 of the decoupled debit server 108 may transmit user information, financial information, and/or additional information to a third party for validation. For example, the decoupled debit module 246 may transmit user information, financial information, and/or additional information to a third party validation server 110. The user validation engine 266 of the third party validation server 110 may obtain the credit history of the user 102, may obtain additional information, such as transaction history for other merchants, verification information from the bank associated with the checking or savings account, criminal history, background check, or the like. The user validation engine 266 may then, based on the additional information obtained, may validate or approve the user 102 for enrollment in the decoupled debit program or may reject the user 102 from enrollment in the decoupled debit program.

At block 425, the decoupled debit module 246 of the decoupled debit server 108 may generate a determination for decoupled debit enrollment based on the user information, financial information, and/or additional information. In some embodiments, the determination may be based on or influenced by the optional validation provided in block 420. In some embodiments, the decoupled debit module 246 may generate a determination based on the user information, financial information, and/or additional information. If the decoupled debit module 246 determines that the user 102 is not approved to be enrolled in the decoupled debit program, then the method may proceed to block 430, where the decoupled debit module 246 may generate and transmit a message including the rejection to the POS device 104. If at block 425, the decoupled debit module 246 determines that the user 102 is approved for enrollment in the decoupled debit program, then the method may proceed to block 435.

At block 435, the decoupled debit module 246 may determine an identifier to associate the checking or savings account of the user 102. In some embodiments, the identifier may be an existing loyalty account identifier associated with the user 102 and the merchant. In some embodiments, a new identifier may be generated by the decoupled debit module 246 for the checking or savings account.

At block 440, the decoupled debit module 246 may store the association of the identifier, the user 102, and the financial information (e.g., routing and account number from the check 106). In some embodiments, the association may be stored in a datastore, such as datastore 230. In some embodiments, the association may be stored in a table maintained by the decoupled debit module 246. In some embodiments, the identifier may also be associated with a loyalty account number or identifier associated with the user 102.

At block 445, the decoupled debit module 246 of the decoupled debit server 108 may generate and transmit a message, including a message indicating that the user 102 has been approved to be enrolled in the decoupled debit program and the identifier, to the POS device 104.

Figure 5:
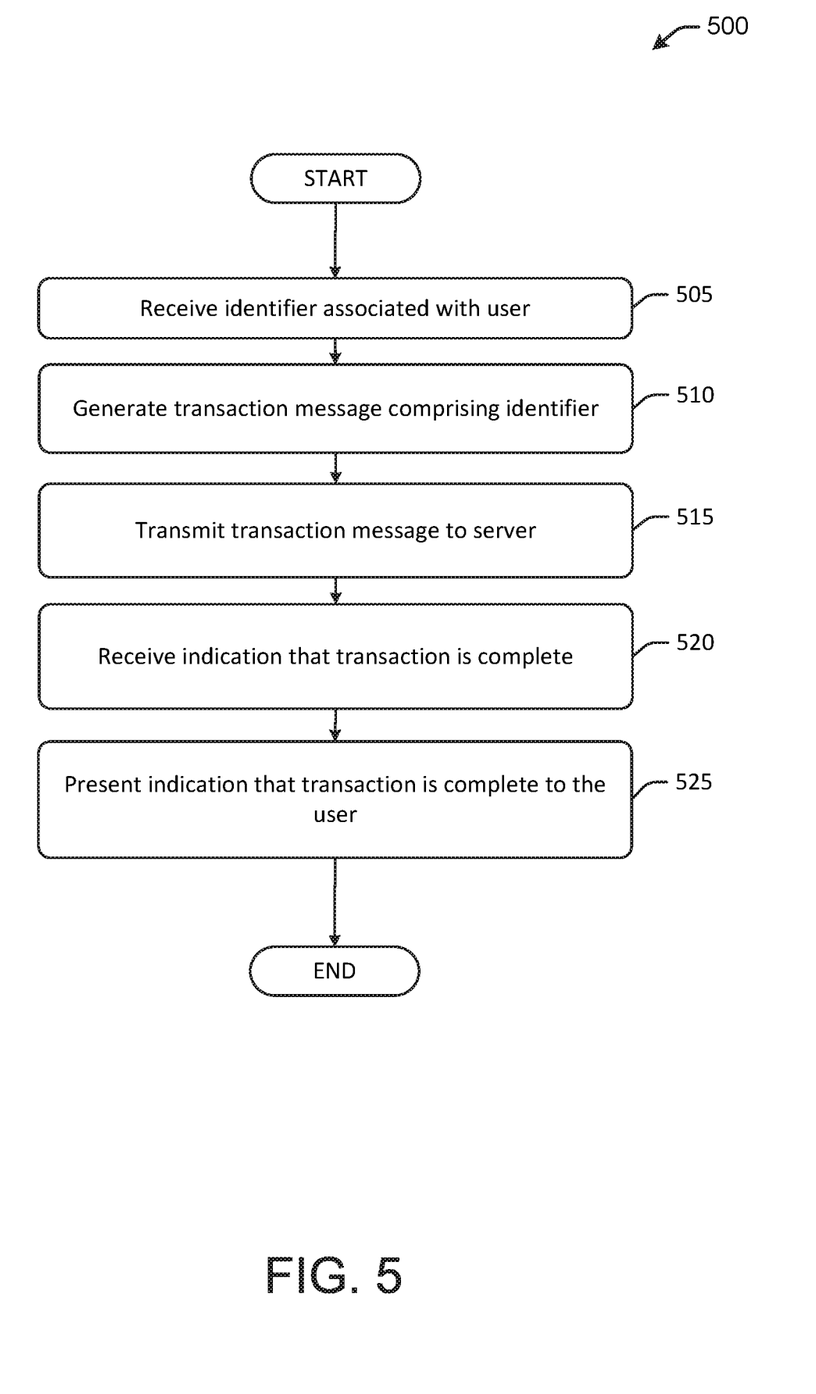
FIG. 5 is a process flow diagram of an illustrative method for utilizing decoupled debit transactions in accordance with one or more embodiments of the disclosure.

FIG. 5 is a process flow diagram of an illustrative method 500 for utilizing decoupled debit transactions in accordance with one or more embodiments of the disclosure. At block 505, the decoupled debit client 226 of the POS device 104 may receive an identifier associated with the user 102. In some embodiments, the identifier may be received by scanning a card issued for the decoupled debit program. In some embodiments, the identifier may be a loyalty card number and is obtained by scanning the loyalty card. In some embodiments, the identifier may be obtained by obtaining identifying information from the user (e.g., phone number, email address, etc.) and looking up the decoupled debit identifier using the identifying information. In some embodiments, the user may specify the identifier via a GUI of the POS device 104. In some embodiments, the user may provide the identifier to a merchant who may enter the number into the POS device 104.

At block 510, the decoupled debit client 226 of the POS device 104 may generate a transaction message comprising the identifier. In some embodiments, the decoupled debit client 226 may generate a transaction message to the decoupled debit server 108 comprising the identifier in lieu of payment information and additional information that may be needed to facilitate completion of the transaction (e.g., amount of transaction). At block 515, the decoupled debit client 226 may transmit the transaction message to a server, such as the decoupled debit server 108, for processing. In some embodiments, the transaction message may be transmitted over one or more networks 210, wherein the connections between the POS device 104 and the decoupled debit server(s) 108 are encrypted or otherwise secure.

At block 520, the decoupled debit client 226 may receive a message from the decoupled debit server 108 indicating that the transaction is complete. In some embodiments, the decoupled debit server 108 may have processed the transaction using financial information identified using the identifier. By having the decoupled debit server 108 process the transaction, the merchant does not have direct access to the financial information of the user 102. In some embodiments, if the financial information is not valid (e.g., insufficient funds, incorrect account number, etc.), the decoupled debit server 108 may transmit a message to the POS device 104 indicating that the transaction was unable to be completed. The POS device 104 may then prompt the merchant to request an alternative method of payment to complete the transaction.

At block 525, the decoupled debit client 226 may present the indication that the transaction is complete to the user 102. In some embodiments, the indication may be presented in the form of a receipt (e.g., emailed or printed), a message on the POS device 104, or the like.

In some embodiments, the user may have multiple checking and/or saving accounts associated with an identifier. In some embodiments, each of the checking and/or savings accounts may be associated with a separate identifier but each of the identifiers may be associated with a loyalty identifier associated with the user. During a transaction, the user 102 may be prompted to select one of the accounts associated with the identifier to complete the transaction.

In some embodiments, a hierarchy of accounts may be associated with the identifier. For example, an identifier may be associated first with a checking account, then a savings account, and a credit card account. In some embodiments, when a transaction is initiated, the system will select the account highest in the hierarchy. If, for some reason, the selected account is unable to be used to complete the transaction, another account from the hierarchy may be automatically selected. In the event that none of the accounts are able to be used to complete the transactions, the decoupled debit server 108 may transmit a message to the POS device 104 indicating that an alternative method of payment is required as the accounts associated with the identifier were unable to be used to complete the transaction.

In some embodiments, a user 102 may enroll in a payment program using the POS device 104. In some embodiments, a user 102 may obtain a physical card (e.g., laminated card with a payment program identifier—the card may be the size of a credit card or may be a smaller card that may be put on a keychain ring). The user 102 may provide personal and financial information to the POS device 104 and the POS device 104 may associate the information with the payment program identifier associated with the physical card. The user 102 may provide the physical card instead of a standard payment method (e.g., credit card, check) and the POS device 104 may obtain the financial information associated with the physical card using the payment program identifier and facilitate a transaction using the obtained financial information. In some embodiments, multiple payment methods may be associated with the payment program identifier and the POS device 104 may request the user 102 to select from the payment methods to complete a transaction. In some embodiments, the POS device 104 may select one of the multiple payment methods associated with the payment program identifier based on pre-determined user preferences or a previously specified hierarchy of the payment methods.

Similarly, in some embodiments, a POS device 104 may enable a user 102 to enroll in a payment program using their user devices. The user device may need to download and install an application for the payment program. Once downloaded, the POS device 104 or the application may initiate and establish a communicative link with the other device. The POS device 104 may obtain or otherwise receive personal information (e.g., name, address, phone number, etc.) and financial information from the application on the user device and may generate a payment program identifier to associate with the information obtained from the application. The POS device 104 may transmit the payment program identifier to the application, which may store the information for future use. The POS device 104 may transmit the payment program identifier and associated information over a secure communicative link or over a network using encryption or secure techniques to a server or datastore for storage. Thereafter, the user 102 may establish a communicative link from the user device with the POS device 104 and may transmit the payment program identifier to the POS device 104, which may use the payment program identifier to retrieve financial information associated with the user to facilitate processing a financial transaction.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions, which can improve the functioning or operation of a server, computer and/or hardware. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
a server; and
a point of sale (POS) device comprising
a camera;
at least one memory that stores computer-executable instructions; and
at least one processor configured to access the at least one memory, wherein the at least one processor is configured to execute the computer-executable instructions to:
identify received user information for a first transaction provided to a graphical user interface of the POS device;
facilitate the camera to capture an image of a check for the first transaction, wherein the image comprises financial information;
generate a first transaction message comprising the user information and the image of the check;
send the first transaction message to the server;
identify an indication received from the server that user enrollment is approved in a decoupled debit program based at least in part on the financial information of the check and user information for the first transaction, and further identify a user identifier received from the server for a decoupled debit program account; and
facilitate presentation of the indication via the graphical user interface.

2. The system of claim 1, wherein the user identifier further comprises a previously existing loyalty identifier.

3. The system of claim 1, wherein the user identifier comprises one or more of a Quick Response (QR) code and a barcode.

4. The system of claim 1, wherein the at least one processor is further configured to:
send the user identifier to an email address or a phone number associated with the user.

5. The system of claim 1, wherein the at least one processor is further configured to:
associate the user identifier with a wallet application on a user device.

6. The system of claim 1, wherein:
the server receives transaction data from the first device, wherein the transaction data comprises user information associated with the user, a check image, and transaction information associated with a transaction;
the server determines financial information from the check image;
the server determines that the user enrollment is approved in a decoupled debit program based at least in part on the user information and the financial information;
the server associates the user identifier with the financial information;
the server completes at least a portion of the current transaction using the financial information;
the server generates a message indicative of the user enrollment being approved in the decoupled debit program, wherein the message further comprises the user identifier; and
the server generates the message to the first device.

7. The system of claim 6, wherein the server further transmits the user information and the financial information to at least one validation server.

8. The system of claim 7, wherein the server further retrieves additional data from the validation server based at least in part on the user information and the financial information.

9. The system of claim 8, wherein the additional data comprises one or more of a credit history associated with the user, a user initiated transaction history from one or more merchant transactions, and a transactional history from a bank account associated with the user.

10. A computer-readable medium storing computer-executable instructions which, when executed by a processor, cause the processor to perform operations comprising:
identifying, by a graphical user interface of a point of sale (POS) device and the processor, received user information provided for a first transaction;
capturing, by a camera of the POS device, an image of a check for the first transaction, wherein the image comprises financial information;
generating, by the processor, a first transaction message comprising the user information and the image of the check;
causing to send, by the processor, the first transaction message to a server;
identifying, by the processor, an indication received from the server that user enrollment is approved in a decoupled debit program based at least in part on the financial information of the check, user information for the first transaction, and a user identifier received from the server for a decoupled debit program account; and
causing to display, by the graphical user display of the POS device, the indication.

11. The computer-readable medium of claim 10, wherein the user identifier further comprises a previously existing loyalty identifier.

12. The computer-readable medium of claim 10, wherein the user identifier comprises one or more of a Quick Response (QR) code and a barcode.

13. The computer-readable medium of claim 10, further comprising computer-executable instructions that cause the processor to perform: sending, by the processor, the user identifier to an email address or a phone number associated with the user.

14. The computer-readable medium of claim 10, further comprising computer-executable instructions that cause the processor to perform: associating, by the processor, the user identifier with a wallet application on a user device.

15. A method comprising:
receiving, by a server, transaction data from a point of sale (POS) device, wherein the transaction data comprises user information associated with the user, a check image, and transaction information associated with a transaction;
determining, by the server, financial information from the check image captured by the POS device, wherein the image comprises financial information;
determining, by the server, that user enrollment is approved in a decoupled debit program based at least in part on the user information and the financial information;
associating, by the server, a user identifier with the financial information;
completing, by the server, at least a portion of the current transaction using the financial information;
generating, by the server, a message indicative of the user enrollment being approved in the decoupled debit program based at least in part on the financial information of the check and the user information for the first transaction, wherein the message further comprises the user identifier; and
transmitting, by the server, the message to the POS device.

16. The method of claim 15, further comprising transmitting, by the server, the user information and the financial information to at least one validation server.

17. The method of claim 16, further comprising retrieving, by the server, additional data from the validation server based at least in part on the user information and the financial information.

18. The method of claim 17, wherein the additional data comprises one or more of a credit history associated with the user, a user initiated transaction history from one or more merchant transactions and a transactional history from the bank account associated with the user.

19. The method of claim 15, further comprising obscuring, by the server, the identifier prior to the transmitting, by the server, the message to the POS device.

20. The method of claim 15, wherein determining, by the server, the financial information from the check image further comprises determining the financial information from the check image using optical character recognition (OCR).

* * * * *